(12) United States Patent
Bateman

(10) Patent No.: US 6,940,427 B2
(45) Date of Patent: Sep. 6, 2005

(54) PITCH ALERTING ANGLE FOR ENHANCED GROUND PROXIMITY WARNING SYSTEM (EGPWS)

(75) Inventor: Peter J. Bateman, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 113 days.

(21) Appl. No.: 10/114,883

(22) Filed: Apr. 1, 2002

(65) Prior Publication Data

US 2003/0016145 A1 Jan. 23, 2003

Related U.S. Application Data

(60) Provisional application No. 60/306,268, filed on Jul. 17, 2001.

(51) Int. Cl.[7] ............................................. G08B 23/00
(52) U.S. Cl. ....................... 340/967; 340/966; 340/979; 340/948
(58) Field of Search ................................ 340/967, 966, 340/969, 970, 972, 973, 980, 974, 975, 976, 977, 978, 979, 959, 948

(56) References Cited

U.S. PATENT DOCUMENTS

| | | | |
|---|---|---|---|
| 3,349,751 A | 10/1967 | Forstad | |
| 3,715,718 A | 2/1973 | Astengo | |
| 3,922,637 A | 11/1975 | Bateman | |
| 3,925,751 A | 12/1975 | Bateman et al. | |
| 3,934,221 A | 1/1976 | Bateman et al. | |
| 3,934,222 A | 1/1976 | Bateman et al. | |
| 3,936,796 A | 2/1976 | Bateman | |
| 3,944,968 A | 3/1976 | Bateman et al. | |
| 3,946,358 A | 3/1976 | Bateman | |
| 3,947,808 A | 3/1976 | Bateman | |
| 3,947,809 A | 3/1976 | Bateman | |
| 3,947,810 A | 3/1976 | Bateman et al. | |
| 3,958,218 A | 5/1976 | Bateman | |
| 3,958,219 A | 5/1976 | Bateman et al. | |
| 3,988,713 A | 10/1976 | Bateman | |
| 4,030,065 A | 6/1977 | Bateman | |
| 4,060,793 A | 11/1977 | Bateman | |
| 4,189,777 A | 2/1980 | Kuntman | |
| 4,215,334 A | 7/1980 | Bateman | |
| 4,319,218 A | 3/1982 | Bateman | |
| 4,433,323 A | 2/1984 | Grove | |
| 4,495,483 A | 1/1985 | Bateman | |
| 4,567,483 A | * 1/1986 | Bateman et al. | ............ 340/970 |
| 4,675,823 A | 6/1987 | Noland | |
| 4,684,948 A | 8/1987 | Bateman | |
| 4,849,756 A | 7/1989 | Bateman | |
| 4,857,923 A | 8/1989 | Bateman | |
| 4,910,513 A | 3/1990 | Kelly et al. | |
| 4,914,436 A | 4/1990 | Bateman et al. | |
| 5,166,682 A | 11/1992 | Bateman | |
| 5,196,847 A | 3/1993 | Bateman | |
| 5,220,322 A | * 6/1993 | Bateman et al. | ............ 340/970 |
| 5,428,354 A | 6/1995 | Torget | |
| 5,781,126 A | 7/1998 | Paterson et al. | |
| 6,157,891 A | 12/2000 | Lin | |
| 6,192,305 B1 | 2/2001 | Schiffmann | |
| 6,341,248 B1 | * 1/2002 | Johnson | ...................... 340/967 |
| 6,484,071 B1 | * 11/2002 | Conner et al. | .............. 340/970 |
| 6,507,289 B1 | * 1/2003 | Johnson et al. | ............. 340/970 |

* cited by examiner

*Primary Examiner*—Jeffery Hofsass
*Assistant Examiner*—Daniel Previl
(74) *Attorney, Agent, or Firm*—Charles J. Rupnick

(57) ABSTRACT

A ground proximity warning system including a pitch angle alerting device, the pitch angle alerting device including warning logic having an input that is structured to receive a signal that is representative of the indicated pitch angle of the aircraft, the warning logic being structured to determine a difference between a pitch angle signal received on the input and a predetermined threshold, the warning logic being structured also to output a signal representative of the difference between the two signals; and an advisory indication generator coupled to accept the output of the warning logic, the advisory indication generator being structured to generate an advisory indication signal as a function of the difference between the two signals.

37 Claims, 3 Drawing Sheets

PITCH ALERTING ANGLE FOR ENHANCED GROUND PROXIMITY WARNING SYSTEM (EGPWS)

This application claims the benefit of U.S. Provisional Application Ser. No. 60/306,268, filed in the name of Peter J. Bateman on Jul. 17, 2001, the complete disclosure of which is incorporated herein by reference.

FIELD OF THE INVENTION

The invention relates to the field of aircraft pitch angle alerting devices and ground proximity warning systems, and more particularly to ground proximity warning systems wherein the warning criteria includes pitch angle of the aircraft.

BACKGROUND OF THE INVENTION

During flight aircraft are susceptible to pitch trim runaway, wherein the aircraft is inadvertently pitched up to an excessive angle. If an aircraft autopilot is mis-trimmed in the pitch axis when engaged, the aircraft could pitch in an uncontrolled manner and surprise the pilot. Certain aircraft models may be more susceptible to pitch trim runaway than others. These include those aircraft which are designed to reduce drag at cruise at the expense of slow speed control. At the slow speeds experienced near a runway, a pilot may be more apt to over control the aircraft pitch, thereby increasing the risk of a potentially hazardous pitch excursion. Also, when a plane is flying at a high pitch angle or rotating to a lift-off pitch angle, the pilot may lose sight of the horizon and become disorientated. In none of these situations does the pilot have advance notice of an excessive pitch excursion, which degrades flight safety.

SUMMARY OF THE INVENTION

The present invention is an apparatus and method for enhancing pilot awareness and improving flight safety by alerting a pilot to an excessive pitch excursion in all the above described situations where excessive pitch excursions and providing advance warning to the pilot to take preventative action.

According to one aspect of the invention, a pitch angle alerting device is provided, including warning logic having an input that is structured to receive a signal that is representative of the indicated pitch angle of the aircraft, the warning logic being structured to determine a difference between a pitch angle signal received on the input and a predetermined threshold, the warning logic being structured also to output a signal representative of the difference between the two signals; and an advisory indication generator coupled to accept the output of the warning logic, the advisory indication generator being structured to generate an advisory indication signal as a function of the difference between the two signals.

According to another aspect of the invention, the warning logic is further structured to compute a rate of change of the indicated pitch angle, and to compensate the received indicated pitch angle signal as a function of the pitch angle rate of change prior to determining the difference between the indicated pitch angle signal and the predetermined threshold, the difference thus being determined between the compensated pitch angle signal and the predetermined threshold.

According to another aspect of the invention, the warning logic is further structured to increasingly compensate the received pitch angle signal as a function of an increase in the rate of change of the pitch angle. Accordingly, the difference is determined between the threshold limit and the pitch angle signal, which is either compensated for a rate of change in the pitch angle or free of such compensation. Furthermore, according to another aspect of the invention, the device includes a selection device coupled to select between the pitch angle signal that is compensated and the pitch angle signal that is not compensated.

According to one aspect of the invention, the pitch angle alerting device is embodied in combination with either a Ground Proximity Warning system or an Enhanced Ground Proximity Warning system. The pitch angle alerting device of the invention is, for example, operational as a ground proximity warning system for a host aircraft, wherein the warning logic of the pitch angle alerting device is operational by the processor on which the warning generator of the ground proximity warning system operates, the processor being further structured to receive a plurality of signals representing aircraft flight parameters which includes the signal representative of the difference between the pitch angle signal and the threshold, the warning logic being further structured to receive a position signal representing a position of the aircraft, the warning logic being further structured to compare the flight parameter signals and to generate the warning signal in response to predetermined relationships between selected flight parameter signals; and ground proximity warning system further supplying condition logic that is operationally connected to the warning logic, the condition logic being structured to receive the position signal and to vary one or more of the predetermined relationships as a function of the aircraft position relative to a predetermined warning location.

The flight parameter signals include, for example, a radio altitude signal, a barometric signal, a glide slope deviation signal, in addition to the difference signal from the pitch angle alerting device of the invention the processor operates the warning logic for generating a warning signal in response to predetermined relationships between radio altitude signal, barometric altitude signal, the glide slope deviation signal, and the difference between the pitch angle signal and the threshold; and the condition logic is structured to receive the position signal and is further structured to vary one or more of the predetermined relationships as a function of the aircraft position relative to a predetermined warning location.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a pitch angle alerting device, having a means for receiving a first signal representing indicated pitch angle and a second signal representing a predetermined threshold pitch angle; a means operatively connected to receive the indicated pitch angle signal and the threshold pitch angle signal for comparing and determining a difference between the indicated and threshold pitch angle signals; and a means operatively connected to the comparing and difference determining means for generating an advisory indication signal as a function of the difference between the indicated and threshold pitch angle signals. The pitch angle alerting device further includes a means for determining a rate of change of the indicated pitch angle and a means for compensating the indicated pitch angle signal. The means for compensating the pitch angle signal operates as a function of the rate of change of the indicated pitch angle. The pitch angle alerting device operates on either one of the indicated pitch angle signal and the compensated pitch angle signal, and further includes means for selecting between the indicated pitch angle signal and the compensated pitch angle signal.

Figure 1:
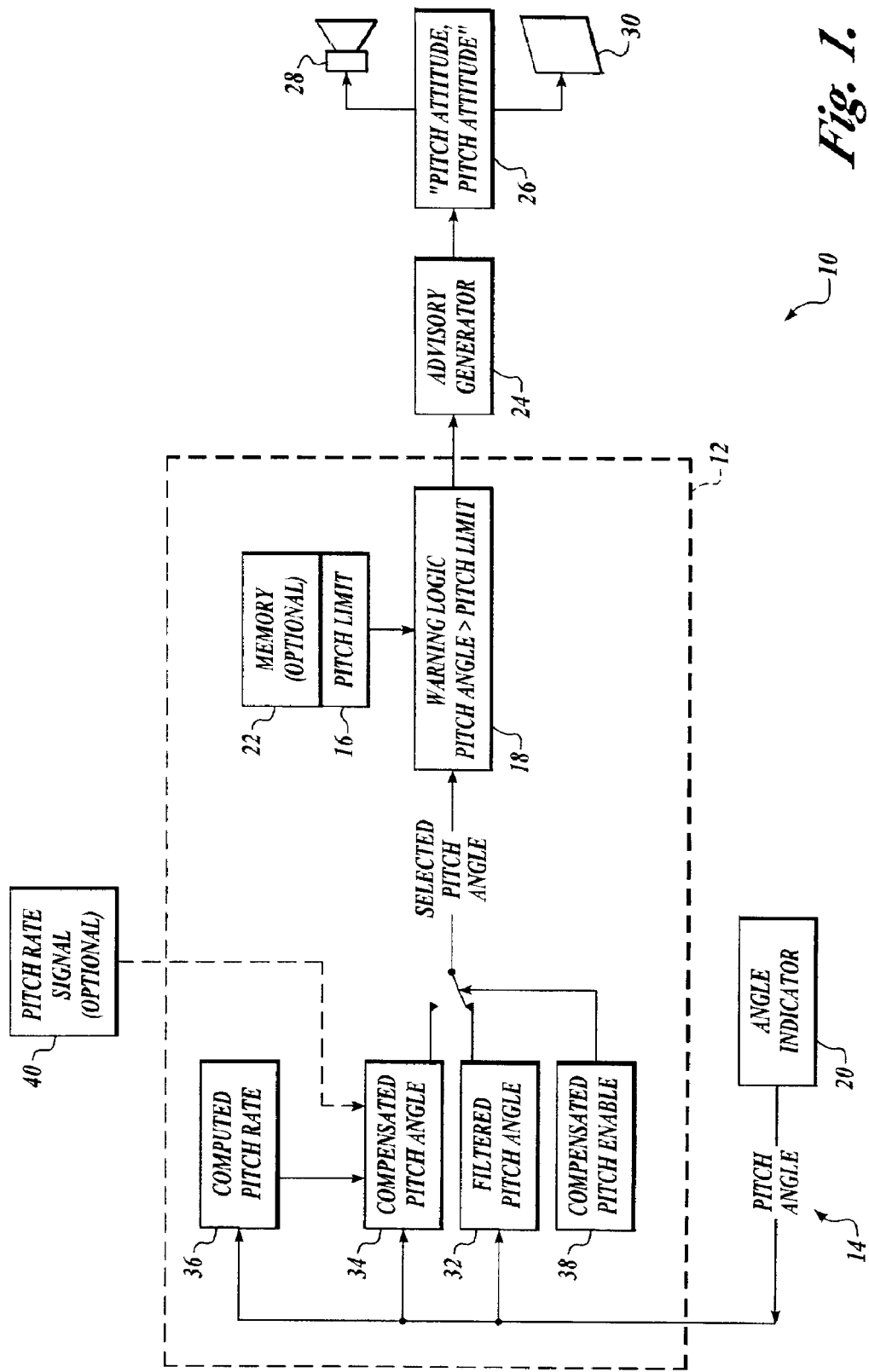
FIG. 1 illustrates a block diagram of one exemplary embodiment of the pitch angle sensing portion of the invention.

FIG. 1 illustrates the pitch angle alerting device of the invention embodied in a block diagram of the pitch angle alerting device 10 for implementation in software or as an equivalent bardwired circuit. As the block diagram of FIG. 1 illustrates, the pitch angle alerting device 10 is operated on a processor 12. A measured or indicated aircraft pitch angle signal 14 and a threshold angle signal 16 are provided as inputs to a warning logic function 18, also known as a "warning generator." The indicated aircraft pitch angle signal 14 is provided by a conventional pitch angle indicator 20 and is monitored by the warning logic 18 at a predetermined sampling rate. The threshold angle signal 16 is provided as a predetermined limit programmed into the warning logic 18. For example, the threshold angle signal 16 is provided as a value stored in a memory 22 that is coupled to the warning logic 18 such that the threshold angle signal 16 is accessible by the warning logic 18.

The warning logic function 18 is, for example, implemented as a circuit having a comparator structured to compare the current sample of the indicated pitch angle signal 14 with the programmed input 16 and to generate an output signal as a function of the difference. Alternatively, the warning logic function 18 operates a pitch angle alert algorithm that makes the comparison and provides the difference signal. The output generated by the warning logic 18 is applied to an advisory indication generator 24, which generates an advisory indication or warning 26 when the indicated pitch angle 14 exceeds the value of the programmed threshold angle 16. For example, the advisory indication generator 24 operates as a "voice" generator and generates the warning 26, as an unambiguous aural alert such as "Pitch Attitude, Pitch Attitude," that is applied to a speaker 28 for annunciation to the pilot if the indicated pitch angle 14 exceeds the programmed alert threshold 16. Alternatively phrased equivalent voice messages may be annunciated to warn the pilot of excessive pitch angle. The advisory indication generator 24 may alternatively operate as a "display" generator and generate an equivalent visual warning 26, such as "Pitch Attitude" or another useful and unambiguous warning on a lighted display 30 in view of the pilot.

Multiple different embodiments of the pitch angle alerting device 10 of the invention are contemplated. According to one embodiment of the invention, the pitch angle alerting device 10 operates on an uncompensated indicated pitch angle signal, which is the indicated pitch angle signal 14 that is passed through a filter 32 to reduce noise. In other words, the pitch angle alerting device 10 operates on a filtered but substantially direct measurement of aircraft pitch angle as provided by the pitch angle indicator 20. According to another embodiment, the indicated pitch angle signal 14 is passed through a compensation function 34, wherein the signal 14 is filtered to reduce noise and compensation is added. The pitch angle alerting device 10 of the invention thus operates on a filtered and compensated indicated pitch angle signal output by the compensation function 34. According to another embodiment of the invention, the indicated pitch angle signal 14 is selectable between the uncompensated indication signal and the compensated indication signal. For example, a switch or pin select 38 is set to couple one or the other of the filter 32 and the compensation function 34 with the warning logic 18. Alternatively, the selection is set in software.

Accordingly, a selected one of the uncompensated and compensated indicated pitch angle signals 32, 34 is compared with the programmed threshold angle 16 by the alert algorithm operated by the warning logic 18. The advisory indication generator 24 generates the warning 26 as a function of the difference determined by the warning logic 18. The warning 26 is generated if the indicated pitch angle 14 exceeds the programmed threshold angle 16. However, if the indicated pitch angle 32, 34 fails to exceed the programmed threshold angle 16, the pitch angle alerting device 10 of the invention continues to monitor the pitch angle indication signal 32, 34 without generating the warning 26.

As described above, the signal output by the filter 32 is the filtered but uncompensated indicated pitch angle signal 14. In contrast, the compensated indicated pitch angle signal output by the compensation function 34 includes a biasing factor that is used to account for rapid changes in the aircraft pitch angle, which maybe computed as the rate of change of the indicated pitch angle signal 14 or may be received as an input "pitch rate" signal. When computed by the alerting device 10, the indicated pitch angle signal 14 is applied to a pitch rate function 36, which monitors it over a predetermined sample period and computes a pitch rate. The pitch rate function 36 outputs a pitch rate signal which is applied to the compensation function 34 for computing the compensated indicated pitch angle signal. Alternatively, the pitch rate is received directly as an input "pitch rate" signal 40. The compensation alters the indicated pitch angle signal 14 that is applied to the warning logic 18, particularly when a high pitch rate is present. For example, the indicated pitch angle signal 14 is biased upwards by a compensation factor that is either a predetermined quantity or a quantity that is computed as a function of pitch rate. The compensation factor may be limited to provide a predetermined maximum compensation, for example, a maximum compensation of 10 degrees.

According to one embodiment of the invention, the compensated indicated pitch angle signal output by the compensation function 34 is equivalent to the indicated pitch angle signal 14 biased upwards by a computed compensation factor, whereby the value of the pitch rate is multiplied using a predetermined multiplication factor, and the result is added to the value of the indicated pitch angle signal 14, as given by:

$$C = I + (R*G) \qquad \text{(Eq. 1)}$$

where: C is the compensated indicated pitch angle signal output by the compensation function 34, I is the indicated pitch angle signal 14,
R is the computed pitch rate output by the pitch rate function 36, and
G is pitch rate gain.

The compensation thus increases as a function of increasing pitch rate R. The pitch rate gain G is represented as a multiplication factor. The pitch rate gain G may be 1 or unity, whereby the compensated indicated pitch angle signal C output by the compensation function 34 is simply the sum of the indicated pitch angle signal 14 and the pitch rate R.

However, the pitch rate gain G may be a positive multiplier, so that the indicated pitch angle signal 14 is biased upwardly by adding a compensation factor that is computed using the pitch rate R multiplied by the gain G. For example, the indicated pitch angle signal 14 is biased upwardly by adding a compensation factor that is computed using the computed pitch rate R multiplied by the positive gain G of 1.2, so that a compensation factor of 1.2 degree is added to the indicated pitch angle signal 14 for every 1 degree/second of pitch rate. Accordingly, for an indicated pitch rate 14 of 1 degree and a computed pitch rate R of 1 degree/second, the compensation function 34 computes the indicated pitch angle signal C as 1 degree plus 1 degree/second times 1.2, which computes to 2.2 degrees. In another example, for an indicated pitch rate 14 of 16 degrees and a computed pitch rate R of 11 degrees/second, the compensated indicated pitch angle signal C is the sum of 16 degrees plus 11 degrees/second times 1.2, which computes to 16 degrees plus 13.2 degrees and equals 29.2 degrees. If the threshold angle 16 is pre-set at 30 degrees, the pitch angle alert algorithm operated by the warning logic 18 will output a signal, for example, LOW or FALSE, that indicates that the indicated pitch angle 14 does not exceed the predetermined threshold angle 16. The advisory indication generator 24 does not generate the warning 26.

However, in yet another example, for an indicated pitch rate 14 of 27 degrees and a computed pitch rate R of 5 degrees/second, the compensated indicated pitch angle signal C is computed as 27 degrees plus 5 degrees/second times 1.2, which computes to 27 degrees plus 6 degrees and equals a sum of 33 degrees. Given that the threshold angle 16 is pre-set at 30 degrees, the pitch angle warning logic 18 will output a signal, for example, HIGH or TRUE, that indicates that the indicated pitch angle 14 does exceed the predetermined threshold angle 16. The advisory indication generator 24 receives the output of the pitch angle warning logic 18 and generates the warning 26, as described above.

The pitch rate gain G may be a constant as described above, or may vary as a function of either the pitch rate R or the indicated pitch angle 14. Equivalent embodiments of the pitch angle alerting device 10 of the invention include adding to the indicated pitch angle signal 14 a compensation factor that is a predetermined fixed or constant additive value K that is independent of the value of either the pitch rate R or the indicated pitch angle 14, as given by:

$$C = I + K \quad \text{(Eq. 2)}$$

where: C is again the compensated indicated pitch angle signal output by the compensation function 34,
I is again the indicated pitch angle signal 14, and
K is a predetermined constant value.

Furthermore, the compensation factor is adjustable for different aircraft types, as is discussed below. Such adjustability applies whether the compensation factor is the pitch rate R multiplied by the pitch rate gain G, or is the predetermined constant additive value K.

Different aircraft have a greater or lesser responsiveness to pitch control. For example, a smaller, more maneuverable aircraft generally requires less warning of an excessive pitch angle in advance because it is more responsive to a commanded correction. Therefore, the simpler, uncompensated pitch angle indication signal output by the filter 32 may be selected in applications of the pitch angle alerting device 10 to smaller private and business-class aircraft. The compensated pitch angle indication signal output by the compensation function 34 is selected for larger commercial aircraft to provide early warning of over pitching. The pitch rate gain G used in the pitch angle alerting device 10 is optionally adjustable for different commercial aircraft types based upon the aircraft's responsiveness to pitch control commands.

Figure 2:
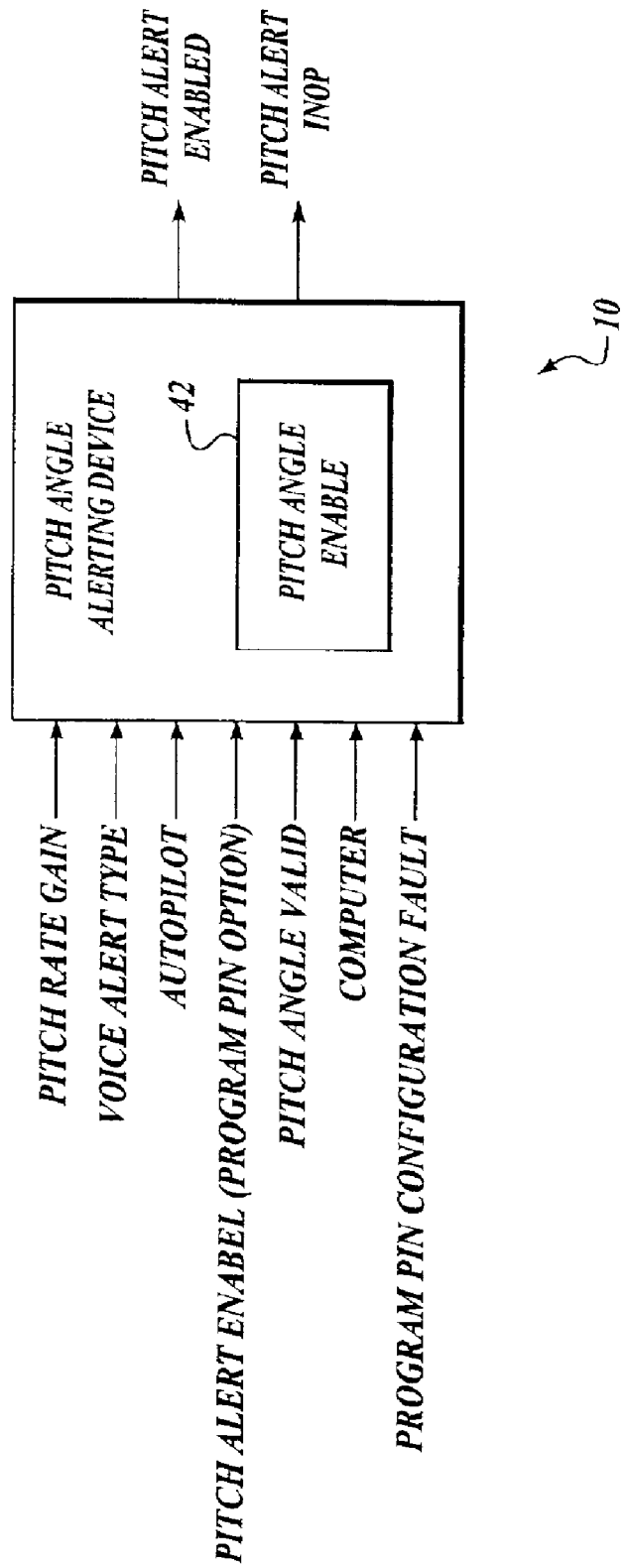
FIG. 2 illustrates a block diagram of an alerting mechanism in the invention that is activated by a pitch angle input greater than the instantaneous pitch angle limit.

FIG. 2 illustrates the pitch angle alerting device 10 of the invention embodied as having different configurable inputs that confirm the validity of the warning 26 and avoid or completely eliminate nuisance warnings. As embodied in FIG. 2, the pitch angle alerting device 10 of the invention includes the following configurable inputs: alert threshold angle 16; pitch angle compensation engaged; pitch rate gain G; autopilot engaged; continuous or ratcheted warning 26. Accordingly, the programmed alert threshold angle 16 configuration determines the pitch angle value to which the selected uncompensated or compensated indication signal is compared. The alert threshold angle 16 is further configurable as a function of the aircraft type. For example, the alert threshold angle 16 may be set higher for the smaller, more maneuverable aircraft discussed above that generally requires less advanced warning of an excessive pitch angle because of its quicker response to a commanded correction.

The pitch angle compensation configuration determines whether pitch angle compensation is engaged or disengaged. As discussed above, the simpler, uncompensated pitch angle indication signal output by the filter 32 may be selected in for smaller aircraft that are more responsive to pitch control commands, while the compensated pitch angle indication signal output by the compensation function 34 is selected to provide early warning for larger aircraft. Furthermore, a lower or more conservative alert threshold angle 16 may be implemented when the compensation is disengaged so that an earlier warning of over pitching is provided to balance the lack of compensation.

The pitch rate gain G used in pitch angle compensation configuration determines amount of advance warning provided of over pitching when the compensation is engaged, as is discussed herein in detail.

The autopilot configuration is used to set a lower or more conservative alert threshold angle 16 when the autopilot is engaged. Engaging the autopilot thus results in a higher level of sensitivity to potential tail strikes than is used when the pilot is in full command.

The warning 26 configuration determines whether the warning 26 is annunciated in a continuous or "ratcheted" mode. A continuously annunciated warning 26 may distract the pilot during a heavy work-load phase of flying. The warning 26 may thus be ratcheted so as to de-clutter the voice or panel display distractions placing demands on the pilot. For example, the warning 26 may be annunciated originally when the indicated pitch angle signal 14 exceeds the alert threshold angle 16, and thereafter annunciated only when the indicated pitch angle signal 14 exceeds the alert threshold angle 16 by a predetermined additional amount, such as 20 percent.

Additional other inputs to the pitch angle alerting device 10 of the invention may be useful for avoiding or completely eliminating nuisance warnings by disengaging the pitch angle alerting device 10 when one or more inputs to the alerting device 10 are invalid. These inputs are applied, for example, to a "pitch angle enable" function 42 of the pitch angle alerting device 10, which enables the alerting device 10 when inputs useful for eliminating nuisance warnings are valid. One input, a "pitch alert enable" signal, is provided by a program pin setting to confirm that the pitch angle alerting device 10 is engaged. The "pitch alert enable" is set to TRUE while the pitch angle alerting device 10 is engaged, but is set to FALSE if the pitch angle alerting device 10 is disengaged.

Another input, a "pitch angle valid" signal, monitors and reports the continuous validity of the indicated pitch angle signal 14 output by the pitch angle indicator 20. The "pitch angle valid" is set in software to TRUE while the indicated pitch angle signal 14 is valid, but changes to FALSE if the signal 14 fails.

Another input, a "program pin configuration" signal, monitors and reports the continuous validity of the program pin configuration. While the program pins are properly configured, the "program pin configuration" signal is set in software to TRUE. A FALSE output indicates that the program pin configuration is faulty and warns the pitch angle alerting device 10 to disregard excessive pitch angle indications.

A "computer" signal reports the continuous validity of the processor 12 that operates the pitch angle alerting device 10. The "computer" is set in software to TRUE while the processor 12 is operational, but changes to FALSE if it fails.

Some of these additional inputs help to determine how the pitch angle alerting device 10 interacts and operates with an onboard ground proximity warning system (GPWS), including an enhanced ground proximity warning system (EGPWS).

Various systems that provide warnings or advisory indications in the event of hazardous flight conditions are known. Among such systems are systems generally known as ground proximity warning systems for aircraft that serve to monitor the flight conditions of an aircraft and provide a warning if flight conditions are such that an inadvertent contact with the ground is imminent. Among the flight conditions monitored by such systems are radio altitude and rate, barometric altitude and rate, airspeed, and flap and gear positions. The aforementioned parameters are monitored, and an advisory indication or a warning is generated when the relationship between the aforementioned conditions or parameters is such that ground impact is likely to occur. Typical examples of such systems are disclosed in U.S. Pat. Nos. 3,715,718; 3,936,796; 3,958,218; 3,944,968; 3,947,808; 3,947,810; 3,934,221; 3,958,219; 3,925,751; 3,934,222; 4,060,793; 4,030,065; 4,215,334 and 4,319,218, all assigned to the assignee of the present invention (Honeywell) and incorporated herein by reference in their entirety. Additional examples of such systems are disclosed in U.S. Pat. Nos. 3,349,751; 3,988,713; 4,189,777; 4,433,323; 4,495,483; 4,684,948; 4,849,756; 4,857,923; 4,914,436; 5,166,682; 5,196,847; 5,220,322; 5,428,354; 5,781,126; and 6,157,891, all owned by the assignee of the present invention (Honeywell) and incorporated herein by reference in their entirety.

While the above-described systems provide advisory and warning signals in the event of proximity to terrain, such systems generate warnings based on the flight conditions of the aircraft, without utilizing navigation information. Consequently, the sensitivity of such systems is adjusted to provide adequate warnings when a hazardous flight condition exists without generating false or nuisance warnings when there is no danger.

One attempt to correct some of the nuisance warnings when flying over terrain unique to particular geographic areas and shorter than desired warning times in other geographic areas has been to modify the warning envelopes of the ground proximity warning system in accordance with the geographic location of the aircraft in order to optimize the warning criteria for the particular geographic area over which the aircraft is flying. An example of such a system is described in U.S. Pat. No. 4,567,483, which is assigned to the assignee of the present invention and is incorporated herein by reference in its entirety. In the system disclosed in U.S. Pat. No. 4,567,483, the warning criteria are optimized to suit the terrain characteristics about certain limited areas, particularly the characteristics of particular airports where nuisance warnings and other problems have been encountered.

Another approach utilizing a geographical input is used in U.S. Pat. No. 4,224,669, which is incorporated herein by reference in its entirety, and wherein a memory device is employed to store minimum safe altitudes by geographic coordinate areas. A navigational computer is used to determine the position of the aircraft, and a warning is given if the aircraft descends below the stored minimum safe altitude for the coordinate area in which the aircraft is flying. The system includes a "worst case" and a "tactical" mode of operation. In the "worst case" mode, the minimum safe altitude is determined as a function of the highest terrain feature or obstacle within the geographic coordinate area of interest. In the "tactical" mode of operation, current flight conditions such as position, ground speed and ground track are used to define a minimum safe altitude based on the height of terrain and obstacles immediately ahead of the projected flight path.

U.S. Pat. No. 4,675,823, which is assigned to the assignee of the present invention and is incorporated herein by reference in its entirety, describes a ground proximity warning system that utilizes geographic position data to alter the warning criteria according to the terrain features of particular geographic areas. Determination of whether the aircraft is within a particular geographic area is provided by having the world subdivided into latitude bands that are in turn subdivided into non-overlapping zones by predetermined lines of longitude, with the position of each zone being defined by the latitude and longitude coordinates of one of its corners. The zones are further defined by regions which may overlap other zones. The regions are limited in size, and their positions are also defined by the locations of one of their corners. The regions are further subdivided into one or more geographic areas that are defined by their shapes and locations within the region. Inputs from the navigational system of the aircraft are used successively to determine whether the aircraft is in a particular latitude band, zone, region and area, and adjustments to the warning criteria are made to optimize the performance of the warning system for the area in which the aircraft is flying. A "snapshot" is made over known territory to verify the validity of the barometric altitude signal before any modification to the warning criteria is made.

Briefly, the world or geographic area of interest is subdivided into latitude bands which are further subdivided into a plurality of non-overlapping zones by predetermined lines of longitude. Each zone contains a region that contains one or more areas wherein the warning criteria must be modified. Each region is limited in size to a predetermined number of degrees latitude and longitude, but may overlap more than one zone. Each area within a region is defined by its position within the zone and its shape, with the shape being defined as one of several standard shapes, such as a rectangle, a parallelogram, a triangle, a circle, a sector of a circle, an ellipse or other figure.

The aforementioned information is stored in memory, with the locations of the zone, regions and areas being defined by one corner of the zone, region or area, respectively, for example the southwest corner. In addition, areas are defined by size and a code identifying the particular shape of the area. The warning criteria modification required for each area is also stored, as is data indicative of other criteria that must be met before a modification of the warning criteria is permitted.

The use of such a data storage format reduces the quantity of data required to define the various areas, and reduces the calculation time required to determine whether the aircraft is in an area that requires warning criteria modification. The reduction in storage and computation time is accomplished by comparing the position of the aircraft with the stored data first to determine the position of the aircraft with respect to a latitude band, then to a zone, then to a region, and then finally to an area. For example, the latitude of the aircraft, as provided by the navigation equipment, is compared with the latitude boundaries of one of the bands. If it is not within that latitude band, the position is compared with the latitude boundaries of the next band, and so forth until the correct band is located. Then, the present longitude of the aircraft is compared with the longitude boundaries of two adjacent zones, as determined by the longitudes of two corresponding corners of two adjacent zones. The comparison is repeated until the current zone is determined. Next, a determination is made whether the aircraft is within a region within the zone, and if so, whether it is within an area within the region. If the aircraft is within an area, as defined by the position, size and shape of the area with respect to the region, the appropriate modifications are made to the warning criteria. If there is any ambiguity about the location of the aircraft, or any doubt about the validity of any of the navigation signals or vertical position signals, no modification is made, and the standard warning criteria arc utilized.

Figure 3:
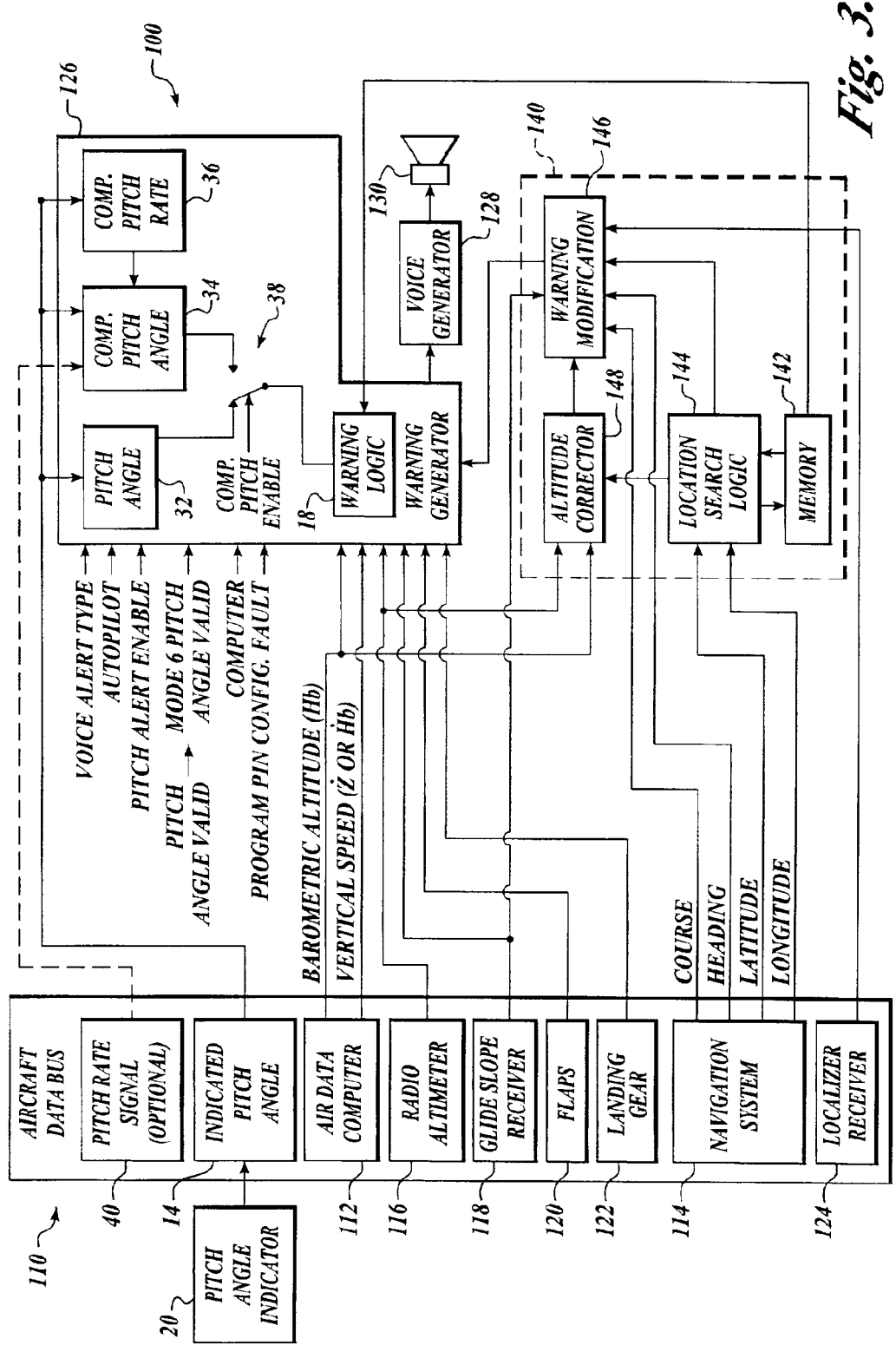
FIG. 3 is a functional block diagram that illustrates one embodiment of the pitch angle alerting device of the invention in combination with a ground proximity warning system having geographic area determination.

FIG. 3 is a functional block diagram illustrating one embodiment of a ground proximity warning system with geographic area determination and including the pitch angle alerting device 10 of the invention, the ground proximity warning system being generally designated by the reference numeral 100. The underlying ground proximity warning system 100 is more fully described in the above incorporated U.S. Pat. No. 4,675,823. As described in U.S. Pat. No. 4,675,823, the warning system 100 according to the invention includes an aircraft data bus 110 that includes an aircraft data bus that provides various signals to the ground proximity warning system. A detailed description of the signals available to a ground proximity warning system is provided in the ARINC Characteristic 429 as published by Aeronautical Radio, Incorporated of Annapolis, Md. Included in the signals provided by the aircraft data bus 110 are: barometric and radio altitude signals; a vertical speed signal; course, heading, latitude and longitude signals; a radio glide slope signal; flap and gear position signals; and localizer receiver signals. These signals are then used as inputs to a warning logic circuit, which in turn is effective to generate an advisory or warning signal whenever the various flight parameters indicate that the aircraft is in an unsafe condition with respect to the terrain. The advisory or warning signal is applied to a voice warning generator, that in turn generates a voice warning signal that results in a voice warning being annunciated by means of a cockpit speaker.

For example, the warning system 100 as embodied in FIG. 3 uses data from an air data computer 112 or from a barometric altimeter and a barometric rate circuit present on the aircraft to provide information about the barometric altitude of the aircraft and the vertical speed of the aircraft. The vertical speed may be expressed as a barometric rate, or as Z velocity, which may be obtained from an onboard inertial navigation system. Data is also received from a navigation system 114 on the aircraft to provide information about the course, heading, latitude and longitude of the aircraft. The navigation data may be obtained directly from the navigation system, which may include an inertial navigation system, a satellite navigation receiver, VLF/OMEGA, Loran C, VOR/DME or DME/DME, or from a flight management system. In addition, the warning system 100 utilizes signals from a radio altimeter 116, a glide slope receiver 118, and discrete signals from discretes 120 and 122 that indicate the position of the flaps and landing gear. Also used are signals from a localizer receiver 124, which indicates whether the aircraft is on the correct course for a landing.

The warning system 100 is described herein in an aircraft environment; however, the warning system 100 is also usable for other vehicles that must navigate around terrain, such as, for example, submarines. The signals from the air data computer 112, the radio altimeter 116, the glide slope receiver 118, and the flap and landing gear discretes 120 and 122 are applied to a warning logic circuit or warning generator 126. The warning generator 126 may form part of a system generally known as a ground proximity warning system, examples of which are disclosed in the previously referenced patents, that initiates a warning when the signals applied thereto indicate a hazardous flight condition. When such a hazardous condition is detected, a warning initiation signal is applied to a voice generator 128 which applies an appropriate voice warning, either directly, or via the aircraft intercommunication system, to a speaker transducer 130 to thereby annunciate the warning to the pilot.

The warning generator 126 initiates a warning when various hazardous flight conditions occur according to the warning system 100. Among the hazardous flight conditions that can cause a warning to be initiated are a negative climb after take-off, an insufficient terrain clearance, an excessive sink rate, an excessive closure rate, and a below glide slope approach. The criteria for initiating such warnings are defined by predetermined component values in analog warning generators, and by stored data in digital warning generators, that define the warning criteria in terms that may be graphically represented as graphs known as warning envelopes. Examples of such warning envelopes are disclosed in U.S. Pat. No. 3,936 796, which is incorporated herein by reference.

The warning criteria, or warning envelopes of a ground proximity warning system, are tailored to maximize warning times, while minimizing false or nuisance warnings. However, it is impossible to tailor warning envelopes that are optimum for all types of terrain, and consequently, most warning envelopes are the result of a compromise that permits satisfactory performance under most flying conditions, even though they may not be optimized for certain unusual geographic areas. Thus, there is provided a system 140 that receives signals from the navigation system 114, as well as other signals, and modifies the warning criteria or warning envelope used to initiate a warning by the warning generator 126 in accordance with the geographic location of the aircraft in order to optimize the warning envelopes for unusual terrain characteristics that occur in certain predetermined geographic areas. The system 140 includes a memory 142 that contains the locations and boundaries of the areas that require envelope modification, as well as the warning modifications required. Location search logic 144 is employed to monitor the position of the aircraft so as to determine whether the aircraft is in an area that requires envelope modification. If the aircraft is in such an area, the logic 144 initiates a warning modification via a warning modification circuit 146 which operates condition logic that inhibits the modification in the event that certain other criteria are not met. The aforementioned other criteria are discussed in greater detail in U.S. Pat. No. 4,675,823. If sufficiently accurate navigation data is available, an altitude corrector 148 may be utilized to correct the barometric altitude reading to correspond to an altitude reading taken by measuring the radio altitude over terrain of known elevation. Otherwise, the warning modifications may simply be inhibited in the event of a discrepancy between the barometric altitude reading and the radio altitude reading over known terrain.

As previously stated, the memory 142 contains the locations and boundaries of the areas wherein warning envelope modification is desirable. The locations of such areas are compared with the present position of the aircraft to determine whether an envelope modification is necessary, and the nature of such a modification. However, to constantly compare the present location of the aircraft with the locations of each of the areas wherein envelope modification is required would require an excessive computing capacity or an excessive computing time that would not be compatible with the physical and time requirements of a ground proximity warning system. Consequently, rather than simply storing the locations and boundaries of the areas that require envelope modification, the world is divided into latitude bands that are further divided into zones by predetermined lines of longitude, which are further divided into regions that may contain one or more areas that require warning envelope modification, as described in greater detail in U.S. Pat. No. 4,675,823.

In known ground proximity warning systems the warning criteria or warning envelopes have been normalized to provide a practical balance between giving a pilot timely warning when the aircraft is in a situation where inadvertent flight into terrain is a possibility, while at the same time, resulting in a minimum of nuisance warnings. A nuisance warning is a warning generated by a ground proximity warning system when the aircraft is operating normally with respect to the terrain and there is little or no danger of inadvertently flying into the ground. Nuisance warnings are, however, considered to be highly undesirable in that they tend to reduce pilot confidence in the warning system and may result in the pilot disregarding a subsequent valid ground proximity warning. As a result it has always been considered highly desirable to minimize nuisance warnings to the maximum extent compatible with providing timely warnings where the aircraft is actually in some danger of impacting the ground. Some attempts to reduce nuisance warnings have centered on the attempt to provide optimum warning envelopes for each type of terrain encountered by the aircraft such that one set of warning envelopes provides a balance between nuisance warnings and actual warnings worldwide. Illustrations of such attempts to provide normalized warning envelopes or criteria for all flight situations are provided in U.S. Pat. Nos. 3,715,718; 3,934,221; 3,925,751; 3,958,218; 4,030,065; 3,944,968; 4,060,793; 4,215,334; 3,947,808; 4,319,218; 3,947,810, all incorporated by reference above, and U.S. Pat. Nos. 3,946,358; 3,934,222; 3,922,637; and 3,947,809, which are all incorporated herein by reference in their entirety.

U.S. Pat. No. 4,567,483, which has been incorporated herein by reference, describes a number of different warning envelopes or warning criteria for use with a ground proximity warning system during different phases of flight in order to reduce nuisance warnings and to increase the effectiveness of real warnings produced by a ground proximity warning system. These warning envelopes or warning criteria are commonly referred to as modes. As described by U.S. Pat. No. 4,567,483, the criteria for generating a warning is varied for certain airport areas to take into account the terrain in those areas. Along with position data, certain flight parameters such as heading, altitude, glide slope and localizer deviation are checked by the system in order to ensure that the aircraft is located in the desired warning modification area. In addition, the ground proximity warning system includes a mechanism for ensuring that the corrected barometric altitude of the aircraft is within acceptable limits.

As described and illustrated in detail by U.S. Pat. No. 4,567,483, the warning envelope or warning criteria for use during different phases of flight include: a warning envelope or warning criteria for the barometric sink rate mode, which is commonly referred to as Mode 1; a closure rate warning mode warning envelope, which is commonly referred to as Mode 2A; a closure rate warning envelope having an airspeed enhancement, which is commonly referred to as Mode 2B; a descent after take-off warning mode, commonly referred to as Mode 3; two terrain clearance warning modes, commonly referred to as Mode 4A and Mode 4B; a glide slope warning mode, commonly referred to as Mode 5; and a Mode 6 that produces advisory alerts and callouts for descent below predefined altitudes, minimums setting and approaching minimums.

The barometric sink rate warning envelope of Mode 1 for a ground proximity warning system and the method of its generation are described in detail in U.S. Pat. No. 4,060,793. Briefly, the sink rate of the aircraft is measured with respect to barometric altitude against the altitude above ground of the aircraft measured in radio altitude. A predetermined relationship between sink rate and radio altitude will generate a "pull-up" voice warning and another predetermined relationship between barometric sink rate and radio altitude will generate a "sink rate" voice warning. As detailed in U.S. Pat. No. 4,060,793, greater barometric sink rates are permitted by the ground proximity warning system logic for greater radio altitudes.

The closure rate warning envelopes of Mode 2A and Mode 2B for a ground proximity warning system and the methods of their generation are described in detail in U.S. Pat. No. 4,060,793. Briefly, Modes 2A and 2B are effective to generate warnings when the aircraft closure rate with respect to the terrain as measured by the radio altimeter exceeds a permissible value for the aircraft radio altitude. The warning area and operation of Mode 2A are described in detail in U.S. Pat. No. 3,934,221. An airspeed enhancement to Mode 2A is described in detail in U.S. Pat. No. 3,958,218. Mode 2B is defined in ARINC characteristic 723 and normally has an operational limitation between predetermined altitude limits above the terrain. Mode 2B normally becomes operational only when the aircraft is in landing configuration and replaces Mode 2A.

The descent after takeoff warning envelopes of Mode 3 for a ground proximity warning system and the methods of their generation are described in detail in U.S. Pat. No. 3,947,810. In Mode 3 barometric altitude loss is measured against the aircraft's radio altitude within predetermined limits.

According to the terrain clearance warning envelopes of Mode 4A and Mode 4B for a ground proximity warning system, aircraft airspeed in Knots is measured against the aircraft's radio altitude. The Mode 4A warning area is operative when the aircraft approaches the ground with the landing gear up. The Mode 4B warning area is operative when the aircraft is too close to the ground with the flaps up. Above a predetermined airspeed, a "too low terrain" voice warning is given for both Mode 4A and Mode 4B. The operation of Mode 4 is described in detail in U.S. Pat. No. 4,030,065.

The glide slope warning envelope of Mode 5 is a measure of the glide slope signal as measured in dots, which is an indication of the angular deviation of aircraft below the glide slope radio beam, against the aircraft's radio altitude. Different predetermined warning criteria are defined for generating a hard glide slope warning and a soft glide slope warning. An example of the implementation of a glide slope warning mode of this type is provided in U.S. Pat. No. 3,925,751.

Mode 6 provides altitude callouts as specified by Aeronautical Radio, Inc. (ARINC) to promote the use of new radio technologies beneficial to aircraft and to increase the safety and efficiency of aircraft navigation and movement of aircraft in and around airports. Mode 6 produces advisory alerts and callouts for descent below predefined altitudes, minimums setting and approaching minimums. Advisory alerts for excessive roll or bank angle are also provided as part of Mode 6, including a rate advance feature which provides earlier indication for rapid onset of excessive bank angles. The "Bank Angle" aural alerts are given twice, and then suppressed unless the roll angle increases by a predetermined amount. Specific callouts are program pin selectable from pre-defined menus. Mode 6 advisory alerts and callouts produce aural and ARINC 429 output indications, but do not produce visual indications.

The pitch angle alerting device 10 of the present invention is implemented as one of the Mode 6 callouts and provide aural alerts in the event of excessive pitch angle. The "Pitch Attitude" aural alerts may be continuous until the pitch angle is reduced to within the pre-programmed limits. Alternatively, the aural alerts are given twice and may be suppressed thereafter, unless the pitch angle increases beyond a predetermined additional amount or percentage, for example, 20 percent. This envelope extension is referred to as "ratcheting" and is intended to de-clutter the aural warnings.

U.S. Pat. No. 4,567,483 provides for envelope modulation, i.e., changes in the warning envelopes of the above Modes, such that optimum ground proximity warning system performance is achieved in certain specified areas without significantly compromising the overall ground proximity warning system effectiveness.

Ground proximity warning system implementation as described in various patents resulted in a number of system improvements which both enhanced and optimized the original ground proximity warning system mode envelope protection to facilitate particular flight path situations at or near airports. However, a few of the more unusual cases were not addressed because of the large impact on overall current ground proximity warning system effectiveness. Most of these cases involved potential nuisance warnings due to precipitous terrain near specific airports, but there were some cases where mode envelope protection could be expanded to better protect against inadvertent descent below the desired glide path.

Digital sensors, avionics and in particular, navigational equipment made it possible to accurately fix the aircraft location with respect to latitude, longitude, altitude and heading. These signals are now basic to most new or proposed large turbo jet aircraft and are available to the ground proximity warning system via the aircraft data bus 110.

Consequently, the ground proximity warning system is able to identify unique topographical locations and accurately determine if the aircraft has entered these locations. This information together with appropriate flight path details can then be used to adjust the ground proximity warning system warning envelopes or Modes to be compatible with the peculiarities of that topographical area without compromising performance outside of the area.

The concept of restricting the ground proximity warning system envelope changes to only unique situations is achieved by the apparatus described in U.S. Pat. No. 4,567, 483. In all cases, if any one of the conditions required to establish a unique situation is not met or at any time fails, ground proximity warning system operation reverts to the ground proximity warning system warning envelopes described above.

U.S. Pat. No. 4,567,483 describes a method of accurately determining aircraft flight path and position with respect to the surrounding topography. This information is used to activate alternate mode envelope parameters which are more suited to the peculiarities associated with the designated location and flight path. For example, U.S. Pat. No. 4,567, 483 describes a ground proximity warning system for aircraft that includes a source of signals representing aircraft flight parameters; a warning logic circuit for comparing the flight parameter signals and generating a warning signal in response to predetermined relationships between selected flight parameter signals; a source of position signals representing the position of the aircraft; and condition logic for varying the predetermined relationships for generating warning signals when the aircraft is in a predetermined warning location. One feature is key logic for comparing at least one of the flight parameter signals to a predetermined value when the aircraft is in one of the predetermined warning locations and is effective to inhibit the variation of the predetermined relationships when the compared flight parameter signal does not correspond to the predetermined value. Another feature is altitude verification logic, responsive to a radio altitude signal and a barometric altitude signal and the position signal, that is effective to generate an altitude verification signal representing the confidence level of the barometric altitude of the aircraft for a specific location of the aircraft.

According to the embodiment of FIG. 3, the pitch angle alerting device is operated on the warning logic or warning generator 126, which replaces the processor 12, shown in the embodiment of FIG. 1. The measured or indicated aircraft pitch angle signal 14 is provided by the pitch angle indicator 20 and is made available on the aircraft data bus 110. The threshold angle signal 16 is provided as a predetermined limit programmed into the alert algorithm of the warning logic function 18, or s a value stored in the memory 142 of the ground proximity warning system 100, which is accessible by the warning logic function 18. The measured or indicated aircraft pitch angle signal 14 and the threshold angle signal 16 are provided as inputs to a pitch angle alert algorithm operated by the warning logic function 18 as part of the warning generator 126 portion of the ground proximity warning system 100. The indicated aircraft pitch angle signal 14 is monitored by the warning logic function 18 at a predetermined sampling rate and compared with the programmed input 16.

The indicated aircraft pitch angle signal 14 is alternatively passed through the filter 32 to reduce noise, or is passed through a compensation function 34, wherein the signal 14 is filtered to reduce noise and compensation is added, as described above. According to one embodiment of the invention as illustrated in FIG. 3, the alert algorithm of the warning logic function 18 operates on either the filtered but uncompensated indicated pitch angle signal output by the filter 32, or on the filtered and compensated indicated pitch angle signal output by the compensation function 34. According to one embodiment of the invention, the indicated pitch angle signal 14 is selectable between the uncompensated indication signal and the compensated indication signal. For example, a switch or pin select 38 is set to couple one or the other of the filter 32 and compensation function 34 with the warning logic function 18. Alternatively, the selection is set in software.

The compensated indicated pitch angle signal output by the compensation function 34 includes a biasing factor that is used to account for rapid changes in the aircraft pitch angle, which is computed as the rate of change of the indicated pitch angle signal 14. The indicated pitch angle signal 14 is applied to the pitch rate function 36, which monitors it over a predetermined sample period and computes a pitch rate. Alternatively, the pitch rate is provided as the "pitch rate" signal 40 and is made available on the aircraft data bus 110. The current pitch rate, either as the output of the pitch rate function 36 or directly as the "pitch rate" signal 40, is applied to the compensation function 34 for computing the compensated indicated pitch angle signal, as described above. The compensation thus alters the indicated pitch angle signal 14 used in the alert algorithm operated by the warning logic function 18, particularly when a high pitch rate is present.

The algorithm operated by the warning logic function 18 initiates a warning output as a function of the difference between the programmed input 16 and the indicated aircraft pitch angle signal 14, which may be embodied either as the filtered but uncompensated indicated pitch angle signal output by the filter 32, or as the filtered and compensated indicated pitch angle signal output by the compensation function 34. When the selected uncompensated or compensated indicated aircraft pitch angle signal exceeds the programmed input 16, a warning initiation signal is applied to the voice generator 128 which applies an appropriate voice warning, either directly, or via the aircraft intercommunication system, to a speaker transducer 130 to thereby annunciate the warning to the pilot. For example, the voice generator 128 generates an aural warning, such as "Pitch Attitude, Pitch Attitude" that is annunciated by the speaker transducer 130 if the indicated pitch angle 14 exceeds the alert threshold 16.

The ground proximity warning system 100 may include additional configurable inputs that confirm the validity of the warning initiation signal applied to the voice generator 128 and avoid or completely eliminate nuisance warnings. Such configurable inputs include: alert threshold angle 16; pitch angle compensation engaged; pitch rate gain G; autopilot engaged; continuous or ratcheted warnings. The alert threshold angle 16 is configurable as a function of the aircraft type.

Additional other inputs to the pitch angle alerting portion of the ground proximity warning system 100 of the invention may be useful for avoiding or completely eliminate nuisance warnings. One input, a "pitch alert enable" signal, is provided by a program pin setting to confirm that the pitch angle alerting device 10 is engaged. Another input, a "pitch angle valid" signal, monitors and reports the continuous validity of the indicated pitch angle signal 14 output by the pitch angle indicator 20. Another input, a "program pin configuration" signal, monitors and reports the continuous validity of the program pin configuration. A "computer failure" signal reports the continuous validity of the warning generator 126 that operates the pitch angle alerting algorithm. As discussed above, some of these additional inputs help to determine how the pitch angle alerting device 10 interacts and operates with an onboard ground proximity warning system (GPWS), including an enhanced ground proximity warning system (EGPWS).

As described above, the pitch angle alerting device 10 may be implemented as one of the Mode 6 callouts and is subject to the limitations normally attendant thereupon. Additionally, the pitch angle alerting portion of the ground proximity warning system 100 of the invention may be inhibited under critical conditions to avoid interference with other warnings that relate to imminent impact with the ground. Therefore, the warning generator 126, which operates the pitch angle alerting device 10 of the invention, includes an additional prioritization mechanism, i.e., instructions or programming, that inhibits initiation of the "Pitch Attitude" aural alerts of the invention when various hazardous flight conditions exist that cause the warning generator 126 to initiate other warnings. The prioritization mechanism is, for example, operated by the warning generator 126 or embedded in the condition logic operated by the warning modification circuit 146 for varying the predetermined relationships for generating warning signals when the aircraft is in a predetermined warning location, as discussed above and described more completely in the above incorporated U.S. Pat. No. 4,567,483. As discussed above, such hazardous flight conditions that can cause a warning to be initiated include a negative climb after take-off, an insufficient terrain clearance, an excessive sink rate, an excessive closure rate, and a below glide slope approach. For example, the pitch alert warning of the invention is suppressed when hazardous flight conditions occur that cause the warning generator 126 to initiate one or more of the Mode 1 sink rate warning, the Mode 2A or Mode 2B closure rate warnings, the Mode 3 descent after take-off warning, the Mode 4A and Mode 4B terrain clearance warnings, and the Mode 5 glide slope warning. The prioritization mechanism may also suppress the pitch alert warning when hazardous flight conditions occur that cause the warning generator 126 to initiate of one or more of the minimums warnings of Mode 6 and, optionally, the advisory alerts for excessive roll or bank angle that are also provided as part of Mode 6. The ground proximity warning system 100 of the invention thus provides for avoid or completely eliminating the pitch angle alerts generated by the pitch angle alerting device 10 of the invention as operated by the warning generator 126.

While the preferred embodiment of the invention has been illustrated and described, it will be appreciated that various changes can be made therein without departing from the spirit and scope of the invention.

What is claimed is:

1. A pitch angle alerting device, comprising:
   warning logic having an input that is structured to receive a signal representative of pitch angle, the warning logic being structured to: compensate the pitch angle signal received on the input, determine that the compensated pitch angle signal is greater than a maximum threshold, and responsively output a signal representative of an excessive pitch excursion; and
   an advisory indication generator coupled to accept the output of the warning logic, the advisory indication generator being structured to generate an advisory indication signal as a function of the excessive pitch excursion.

2. The device of claim 1 wherein the warning logic is further structured to compute a rate of change of the pitch angle, and to compensate the received pitch angle signal as a function of the pitch angle rate of change prior to determining that the pitch angle signal is greater than the maximum threshold.

3. The device of claim 2 wherein the warning logic is further structured to increasingly compensate the received pitch angle signal as a function of an increase in the rate of change of the pitch angle.

4. The device of claim 2 wherein the advisory indication generator generates aural alert.

5. The device of claim 1 wherein the received pitch angle signal is either compensated as a function of a rate of change in the pitch angle or free of such compensation.

6. The device of claim 1 wherein the pitch angle alerting device is operational as a ground proximity warning system for a host aircraft, the warning logic being operational by a processor and being further structured to receive a plurality of signals representing aircraft flight parameters which includes the signal representative of an excessive pitch excursion and being further structured to receive a position signal representing a position of the aircraft, the warning logic being further structured to compare the flight parameter signals and to generate a warning signal in response to predetermined relationships between selected flight parameter signals; and further comprising condition logic operationally connected to the warning logic, the condition logic being further structured to receive the position signal and being further structured to vary one or more of the predetermined relationships as a function of the aircraft position relative to a predetermined warning location.

7. A pitch angle alert generating circuit, comprising:

a compensation function coupled to receive an indicated pitch angle signal and structured to generate and output a compensated pitch angle signal;

a comparator coupled to receive the indicated pitch angle signal and a maximum threshold pitch angle signal and functioning to output a signal as a function of a decreasing difference between the compensated pitch angle and the maximum threshold pitch angle; and an advisory indication generator coupled to receive the decreasing difference signal output by the comparator and to generate an excessive pitch excursion advisory indication as a function of the decreasing difference signal.

8. The circuit of claim 7, further comprising a selection function coupled between the compensation function and the comparator for coupling the compensated pitch angle signal to an input of the comparator.

9. The circuit of claim 8 wherein the compensation function is further structured to receive a signal representative of a the rate of change of the pitch angle and to generate the compensated pitch angle signal as a function of the rate of change of the pitch angle.

10. The circuit of claim 9, further comprising a rate function coupled to receive the indicated pitch angle signal, the rate function being structured to determine the rate of change of the pitch angle and to output a signal representative of the rate of change of the pitch angle.

11. The circuit of claim 10 wherein the compensation function is structured to increase the compensation of the pitch angle signal by a predetermined amount in response to an increase in the rate of change of the pitch angle.

12. The device of claim 11 wherein the pitch angle alert generating circuit is operational as a ground proximity warning system for aircraft, the device further comprising:

a processor operating the function of the comparator, the processor being further structured to receive each of a radio altitude signal, a barometric signal, a glide slope deviation signal, and a position signal representing the global position of the aircraft, the processor being further structured to operate warning logic for generating a warning signal in response to predetermined relationships between radio altitude signal, barometric altitude signal, the glide slope deviation signal, and the decreasing difference signal output by the comparator; and condition logic means operatively connected to the warning logic and being further structured to receive the position signal and to vary one or more of the predetermined relationships as a function of the aircraft position relative to a predetermined warning location.

13. The device of claim 12 further comprising a prioritization mechanism structured to inhibit the pitch angle alert generating circuit when the warning logic is operated to generate a warning signal in response to an indication of one of a negative climb after take-off, an insufficient terrain clearance, an excessive sink rate, an excessive closure rate, and a below glide slope approach.

14. A pitch angle alerting device, comprising:

a means for receiving a signal representing indicated pitch angle and a signal representing a maximum threshold pitch angle;

a means for compensating the indicated pitch angle signal;

a means operatively connected to receive the compensated pitch angle signal and the threshold pitch angle signal for comparing and determining a minimum difference between the compensated and threshold pitch angle signals; and a means operatively connected to the comparing and difference determining means for generating an advisory indication signal as a function of the difference between the compensated and threshold pitch angle signals approaching the minimum difference.

15. The device of claim 14, further comprising:

a means for determining a rate of change of the indicated pitch angle; and wherein the means for compensating the pitch angle signal operates as a function of the rate of change of the indicated pitch angle.

16. The device of claim 14 wherein the comparing and difference determining means operates on one of the indicated pitch angle signal and the compensated pitch angle signal.

17. The device of claim 16, further comprising a means for selecting between the indicated pitch angle signal and the compensated pitch angle signal.

18. The device of claim 14, wherein:

the indicated pitch angle signal is a signal representing the pitch angle of a host aircraft;

the comparing and difference determining means further generating a difference signal representing the difference between the indicated and threshold pitch angle signals; and further comprising:

a means for receiving signals representing flight parameters of the aircraft, the flight parameter signals including the pitch angle difference signal;

warning logic means operatively connected to receive the flight parameter signals for comparing the flight parameter signals and for generating a warning signal in response to predetermined relationships between selected flight parameter signals;

a source of position signals representing a position of the aircraft; and condition logic means operationally connected to the warning logic means and to the source of position signals for varying the predetermined relationships when the aircraft is in a predetermined warning location.

19. The device of claim 18 wherein the warning logic means operates the comparing and difference determining means.

20. The device of claim 18, further comprising means for inhibiting the advisory indication signal as a function of the warning logic means generating a warning signal.

21. The device of claim 20 wherein the flight parameter signals further include each of a radio altitude signal, a barometric signal, and a glide slope deviation signal.

22. A method for generating a pitch angle alert, the method comprising:

receiving a signal representing indicated pitch angle and a signal representing a maximum threshold pitch angle;

compensating the indicated pitch angle signal;

comparing the compensated and maximum threshold pitch angle signals;

determining a difference between the compensated and maximum threshold pitch angle signals; and generating an excessive pitch excursion advisory indication signal as a function of the difference between the compensated and maximum threshold pitch angle signals.

23. The method of claim 22, further comprising:

determining a rate of change of the indicated pitch angle; and wherein compensating the indicated pitch angle signal includes compensating the indicated pitch angle signal as a function of the rate of change of the pitch angle.

24. The method of claim 22 wherein the comparing and the difference determining operations operate on one of the indicated pitch angle signal and the compensated pitch angle signal.

25. The method of claim 24, further comprising selecting between the indicated pitch angle signal and the compensated pitch angle signal for the comparing and the difference determining operations.

26. The method of claim 22, wherein the indicated pitch angle signal is a signal representing the pitch angle of a host aircraft, and further comprising:

generating a difference signal representing the difference between the compensated indicated and threshold pitch angle signals;

receiving signals representing flight parameters of the aircraft, the flight parameter signals including the pitch angle difference signal;

comparing the flight parameter signals; and generating a warning signal in response to predetermined relationships between selected flight parameter signals.

27. The method of claim 26, further comprising suppressing the generating an advisory indication signal as a function of the predetermined relationships between selected flight parameter signals.

28. The method of claim 26, further comprising:

receiving position signals representing a position of the aircraft; and varying the predetermined relationships when the aircraft is in a predetermined warning location.

29. The method of claim 26 wherein the flight parameter signals further include each of a radio altitude signal, a barometric signal, and a glide slope deviation signal.

30. A ground proximity warning system for aircraft, comprising:

a source of signals representing a plurality of aircraft flight parameters, the flight parameter signals including a signal representing an indicated pitch attitude of the aircraft;

warning logic means operatively connected to the source of flight parameter signals for comparing the flight parameter signals and compensating the indicated pitch attitude, the warning logic means generating in response to predetermined relationships between selected flight parameter signals one of a warning signal and an advisory alert signal that is representative of the compensated pitch attitude exceeding a programmed alert threshold;

a source of position signals representing the position of the aircraft; and condition logic means operationally connected to the warning logic means and the source of position signals for varying the predetermined relationships when the aircraft is in a predetermined warning area.

31. The system of claim 30, further comprising means for determining whether the aircraft is in the predetermined area, the area determining means including:

means for first successively comparing one of a present longitude and latitude with a respective stored longitude or latitude representative data defining one of a respective longitude band or a latitude band in which the aircraft is located, and after the one longitude or latitude band has been defined, successively comparing the other of the present longitude or latitude with respective stored longitude or latitude representative data within the defined band to define the other of the longitude or latitude bands in which the aircraft is located, the latitude band and the longitude band defining a zone;

means for defining an area within the zone; and means for determining whether the aircraft is within the area.

32. The system of claim 30, further comprising means for prioritization of the generating the warning signal and the advisory alert signal.

33. The system of claim 30 wherein:

the flight parameter signals further comprise a signal representing a rate of change of the indicated pitch angle signals, and the warning logic means further comprises means for compensating the indicated pitch angle as a function of an increasing rate of change of the indicated pitch angle signals.

34. A ground proximity warning system for aircraft comprising:

a source of radio altitude signals;

a source of barometric signals;

a source of glide slope deviation signals;

a source of indicated pitch angle signals;

a source of position signals representing the position of the aircraft;

pitch angle compensating means operatively connected to the source of indicated pitch angle signals for generating a compensated pitch angle signal;

warning logic means operatively connected to the source of compensated pitch angle signals for generating a signal representing a difference between the compensated pitch angle signals and a maximum limit and responsively indicating that the compensated pitch attitude exceeds the maximum limit, the warning logic means further operatively connected to the sources of radio altitude signals, barometric altitude signals and glide slope deviation signals for generating a warning signal in response to predetermined relationships between the radio altitude signals, barometric altitude signals, glide slope deviation signals and the pitch angle difference signals; and prioritization means operatively connected to the warning logic means for suppressing the warning signal generated in response to the pitch angle difference signals as a function of the predetermined relationships between the radio altitude signals, barometric altitude signals and glide slope deviation signals.

35. The system of claim 34, further comprising condition logic means operatively connected to the warning means and the source of position signals for varying one or more of the predetermined relationships when the aircraft is in a predetermined warning location.

36. The system of claim 34, further comprising means for determining whether a aircraft is located in a predetermined warning location, the location determining means comprising:

means for monitoring the present longitude and latitude of the aircraft;

means for storing data representative of predetermined latitudes, and for storing data representative of predetermined longitudes;

means responsive to signals representative of the present longitude and latitude of the aircraft for successively comparing one of the present longitude or latitude with the respective stored longitude or latitude representative data to define one of a longitude or latitude band in which the aircraft is located;

after the one of the longitude or latitude bands has been defined successively comparing the other of the present longitude or latitude with the respective stored longitude or latitude representative data within the defined band to define the other of the longitude or latitude band in which the aircraft is located;

means responsive to the comparisons for defining a zone within which the aircraft is located, the zone being defined by the intersection of the latitude band and the longitude band;

means for storing data representative of regions and areas within the zones; and means for comparing the present latitude and the present longitude with the region and area representative data, and providing an indication when the aircraft is within a region or an area.

37. The system of claim 34 wherein the pitch angle compensating means further comprises means for compensating the indicated pitch angle signals as a function of a rate of change of the indicated pitch angle signals.

* * * * *